Oct. 21, 1958    K. W. PFLEGER    2,857,513
SIGNAL GENERATOR FOR TESTING TELEPHOTOGRAPH CIRCUITS
Filed July 21, 1953

INVENTOR
K. W. PFLEGER
BY
ATTORNEY

United States Patent Office 2,857,513
Patented Oct. 21, 1958

2,857,513

SIGNAL GENERATOR FOR TESTING TELEPHOTOGRAPH CIRCUITS

Kenneth W. Pfleger, Arlington, N. J., assignor to Bell Telephone Laboratories, Incorporated, New York, N. Y., a corporation of New York Application July 21, 1953, Serial No. 369,481

1 Claim. (Cl. 250—27)

This invention relates to test equipment and more particularly to arrangements for testing transmission circuits to be used for telephotography.

Telephotograph transmission networks have come into general use for the transmission of printed material, photographs and diagrams over considerable distances. The transmission facilities included in such networks may be of various types and it frequently becomes necessary, either in extending such networks or in altering the signaling methods employed, to ascertain the characteristics of the particular transmission circuits involved. It has been one practice to employ a complete telephotograph sender as a source of test signals in such investigations and to ascertain the effect upon known transmitted material as indicated at the receiving end of the circuit under test. An alternative procedure has been to measure the attenuation and envelope delay distortions, noise, and modulation products of the circuit.

These test methods have not been entirely satisfactory, for the following reasons. A telephotograph sending machine together with the associated carrier supplies and filter circuits is a rather cumbersome device which cannot easily be transported to the location of the facility to be tested. The alternative procedure requires four different kinds of measuring sets. The delay measuring set is a cumbersome device which cannot be easily transported. As a result it has been necessary to connect the facility to be tested to the location of a sending picture machine or delay measuring set over other lines of known characteristic and to estimate or compute the characteristics of the unknown facilities from the results obtained with the composite system. Such a procedure obviously necessitates the removal of a considerable amount of relatively expensive equipment from revenue service and may involve much tedious calculation before significant results can be obtained.

It is the object of the present invention, therefore, to provide equipment for testing telephotograph transmission circuits which is simpler and less expensive than the actual telephotograph transmitter or other apparatus heretofore used and which is of such nature that it may be easily transported to the location of the circuits to be investigated.

In accordance with the invention there is provided a test signal generator for telephotograph circuits. This generator includes a source of carrier waves of the frequency normally employed for telephotography, circuits for controlling the application of the carrier waves to the transmission circuits under test in such a way as to produce a predetermined combination of carrier pulses of appropriate amplitudes and means for predistorting the pulses of carrier frequency prior to their application to the circuit under test to simulate the aperture distortion inherent in the scanned picture signals produced by a telephotograph transmitter.

The above and other features of the invention will be described with reference to the drawings in which.

As has been pointed out above, the object of the invention is to provide means for simulating the typical output signals from a telephotograph sender or transmitter which may be employed for testing the transmission characteristics of circuits to be employed therewith. A typical telephotograph sender is described and illustrated in an article entitled "A New Telephotograph System," by F. W. Reynolds, appearing at page 549 of the Bell System Technical Journal for October 1936. As there described a transmitter involves means for scanning picture material to be transmitted with a beam of light interrupted or chopped at the carrier frequency by a light valve. Light reflected from the scanned portion of the picture is picked up by a photoelectric cell which provides an output signal comprising a carrier modulated in accordance with the nature of the picture element scanned at any particular time. It is well known that because of the fact that the material to be transmitted is scanned by a light spot of finite dimension the output signal is subject to a phenomenon known as aperture distortion. The result of such aperture distortion is best demonstrated by the fact that the carrier envelope shape produced in response to transitions between black and white in the picture material is either triangular or trapezoidal rather than rectangular as would be expected from the nature of the material to be transmitted.

Obviously it is the distorted signal envelope which is of significance as an applied signal in determining the characteristics of any transmission circuit to be employed in a telephotograph network. A test signal generator to be substituted for the telephotograph sender should therefore simulate the aperture effect. This is no problem if the test signal is generated by scanning suitable picture material. According to the invention, however, test signals are produced without employing the relatively complex equipment required to produce a signal by scanning techniques, and suitable circuits are provided for simulating the aperture effect so that the test signal accurately portrays the output which would be obtained from an actual telephotograph sender.

Figure 1:
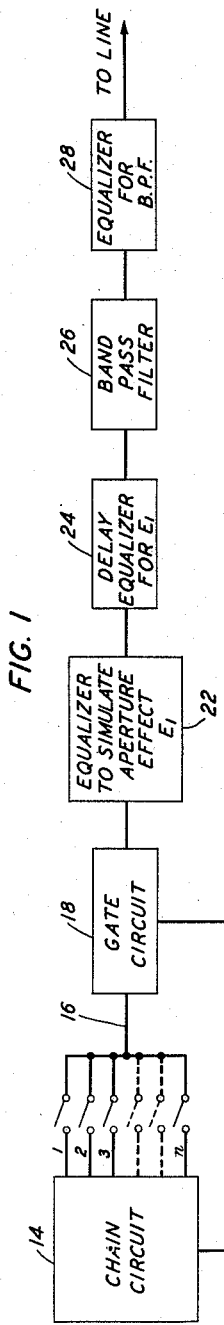
Fig. 1 is a block diagram of a test signal generator according to the invention.

A schematic diagram of a test signal generator according to the invention appears as Fig. 1 of the drawings. In this generator means are provided for producing a predetermined combination of on-off carrier pulses which, taken together, depict the output which might be obtained from a telephotograph transmitter in the scanning of a portion of a scanning line of picture material. For this purpose an oscillator 10 operating at a convenient frequency $F_1$ preferably different from (lower than) the carrier frequency to be employed for telephotography transmission, provides a sine wave output which is converted into a train of on-off pulses by a pulse generator 12. Pulse generator 12 may be of any known type but may conveniently, in one simple arrangement, comprise a well-known type of clipping circuit in which an overdriven amplifier stage converts the sinusoidal output of oscillator 10 into a square wave.

The square wave from pulse generator 12 is applied to control the operation of a chain circuit 14 which is arranged to produce output pulses seriatim upon a plurality of individual output connections. Such chain circuits are well known in the art and may comprise tandem arrangements of flip-flop circuits of the well-known Eccles-Jordan type or may, as illustrated in Patent No. 2,542,644 to J. O. Edson of February 20, 1951, comprise a tandem arrangement of vacuum tubes so interconnected that conduction in one tube of the chain interrupts conduction in the preceding tube and initiates conduction in the succeeding tube. In such chain circuits, individual square wave pulses applied to the input appear serially upon the individual output leads. The duration of each square pulse is chosen to equal the time it takes a telephotograph machine to scan one picture element. When, for example, the scanning rate is 20 inches per second and picture elements are 0.01 inch, it takes 0.0005 second to scan 0.01 inch. When a square pulse lasts 0.0005 second equal to one cycle of $F_1$, the frequency $F_1=2000$ cycles per second.

Conveniently chain circuit 14 may be arranged to provide ten or more separate output leads, 1, 2, 3 ... $n$. These output leads are arranged for selective connection to a common lead 16 by way of switches individual to the several output leads. It will be understood that by suitable positioning of the $n$ switches shown, any desired combination of the $n$ serial pulses appearing at the outputs of chain circuit 14 may be selected as a test signal simulating the output of a telephotograph sender when used for the transmission of black and white material. If halftone signals are to be simulated, the amplitudes of the several pulses must be adjusted to provide for the various shades of gray encountered in such material. The necessary modifications of the circuit for this purpose will be discussed below.

The preselected combination of on-off signals on common lead 16 is applied to a gate circuit 18 to which is also applied the output of an oscillator 20 operating at the frequency $F_2$ which is to be employed as the carrier frequency for transmission over the facility under test. Gate circuit 18 may be of any well-known type and may in one form comprise a vacuum tube having at least two grids acting to control the flow of space current therethrough. In the present application of such a gate circuit, the output of gate circuit 14 is applied to one grid and that of oscillator 20 to the other, the operating conditions of the tube being so chosen that an input signal on either grid alone is not sufficient to cause space current to flow. In this way, the on-off signals appearing on lead 16 serve to key the output of oscillator 20 to provide from the gate circuit output signals comprising bursts of carrier frequency having essentially rectangular envelope characteristics.

Since, as explained above, such rectangular pulse signals are not true representations of the output of a scanning type transmitter they are applied to an equalizer 22 having an input-output characteristic such that the input signals are distorted in the same way as those produced in a scanned picture signal by the aperture effect. This may be accomplished by multiplying the amplitude of the input signal by varying amounts at the different frequencies in the band of frequencies to be transmitted. One characteristic having the desired effect is illustrated in the graph of Fig. 3 in which relative amplitude is plotted as a function of frequency.

Figure 3:
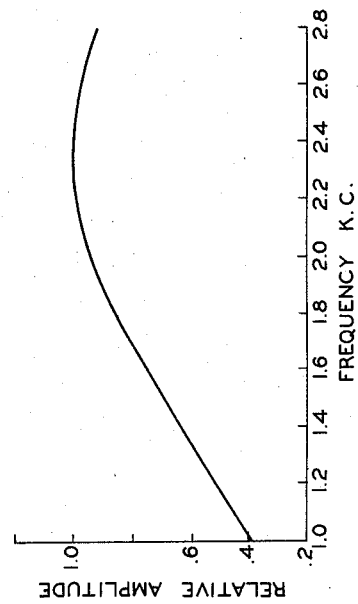
Fig. 3 is a graph illustrating certain characteristics of the equalizer of Fig. 2.

The characteristic shown in Fig. 3 for equalizer 22 may be expressed by the equation $$\text{Relative amplitude} = \frac{A}{K_0} = \frac{F_1}{(F_2-f)\pi} \sin \frac{(F_2-f)\pi}{F_1}$$

$F_1$ and $F_2$ are the frequencies of oscillators 10 and 20 respectively and $f$ is the particular frequency in the band under investigation. $K_0$ is a constant which is included for the sake of generality. Its value depends upon the overall loss or gain in the equalizer 22 at $F_2$. If equalizer 22 has a 6 db loss at $F_2$, then $K_0$ would be 2. If there is no loss at $F_2$, then $K_0$ would be 1. $A$ is a factor which varies with frequency and represents the amplitude of the equalizer output at frequency $f$ when unit input amplitude is applied, the latter being the same at all frequencies. In the example shown in Fig. 3, $F_1=2000$ cycles and $F_2=2400$ cycles.

Figure 2:
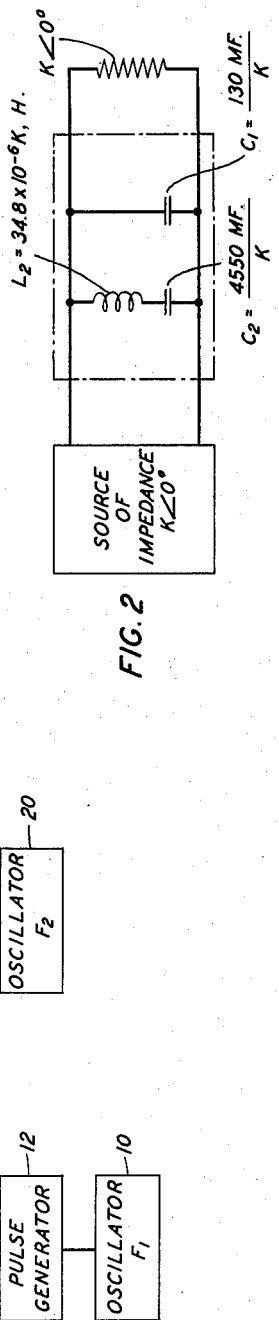
Fig. 2 is a schematic diagram of the aperture effect equalizer of the generator of Fig. 1.

Equalizer networks meeting the requirements of this equation may take a wide variety of forms, one of which is illustrated in the schematic diagram of Fig. 2 for the case where $K_0=1$. This network, comprising a shunt capacitance $C_1$ and a shunt resonant circuit including capacitor $C_2$ and inductor $L_2$, may be employed to produce the desired characteristic if it be assumed that it may be connected in circuit between the purely resistive impedances characterized in Fig. 2 by the designation $K \angle 0°$, where $K$ is a constant expressed in ohms. If, for example, the test signal generator is to be employed for a frequency range extending from 1.2 to 2.6 kilocycles per scond, limited by band pass filter 26, $C_1$, $C_2$, and $L_2$ may have the values given in Fig. 2 of the drawing. If the required resistive impedances indicated in Fig. 2 are not readily attainable in the connected circuits, pads or more complicated equalizing networks of types well known in the art may be employed to obtain the desired characteristics. When pads are inserted, their effect is to increase the value of $K_0$. The loss thus created may be made up by gain in an amplifier added at the input to the line if necessary.

Figure 4:
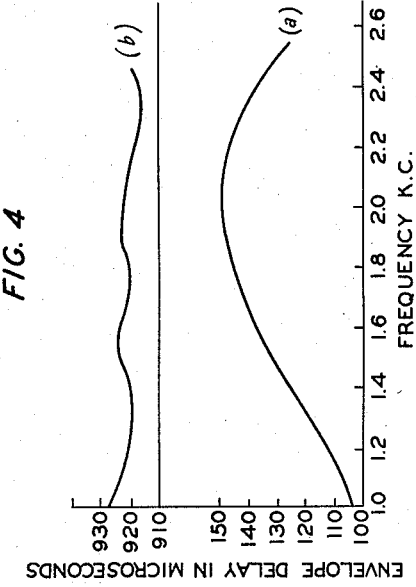
Fig. 4 is a graph illustrating the action of the delay equalizer for the aperture effect equalizer of Fig. 1.

The particular equalizer network shown in Fig. 2 serves to multiply the Fourier components or frequency spectrum of applied signals by the complex quantity $$\frac{1}{1+j\frac{K\omega}{2}\left(C_1+\frac{C_2}{1-\omega^2 L_2 C_2}\right)}$$

where $\omega=2\pi f$. The absolute value of this expression is a close approximation to $A/K_0$ plotted in Fig. 3. It can be shown that this equalizer, while serving to produce the desired amplitude modification, also introduces an envelope delay which varies over the frequency band of interest. In general, any equalizer producing the desired amplitude characteristic will also introduce such a delay. The delay, plotted in microseconds as a function of frequency, for the equalizer of Fig. 2 is shown in curve ($a$) of Fig. 4 of the drawings. Since the effect of delay distortion in the transmission circuit under test is to be investigated, delay distortion is undesirable in the source of test signals. Consequently a delay equalizer 24 is provided to act upon the output of aperture equalizer 22 in such a way as to render the delay substantially constant across the frequency band of interest. Delay equalizers of this type are well understood and comprise networks of inductances and capacitances arranged in tandem and so chosen as to introduce the delays requisite at various frequencies to compensate for the undesired delay characteristic. Curve ($b$) of Fig. 4 illustrates the overall delay characteristic which may be obtained from that of curve ($a$) with relatively simple delay equalizers. If required, more perfect compensation may, of course, be obtained through the use of additional equalizers.

As in the case of telephotograph sending machines, the output signal is applied to a band-pass filter 26 and an equalizer 28 which, acting in tandem, produce a single or vestigial sideband output having a substantially flat delay characteristic. These last two elements may be identical to and serve the same function as the similarly identified elements employed in telephotography transmitters such as that disclosed in the Bell System Technical Journal article referred to above.

The output of equalizer 28 thus comprises a test signal which closely approximates a typical output black and white signal from the telephotograph sending machine normally employed. Many characteristics of this test signal may be varied merely by changing the positions of the selector switches at the output of chain 14. Further, the pulse width may be adjusted by changing the frequency $F_1$ of oscillator 10. In this instance, of course, compensating changes must be made in the constants of the equalizer networks 22 and 24.

The apparatus shown in Fig. 1 simulates the signals from a telephotograph sender scanning black and white copy. A modulator may be substituted in place of gate 18 in Fig. 1 and adjustable attenuators inserted in, leads 1 to $n$ at the output of chain circuit 14, to obtain a test signal the amplitude of which varies in any desired steps between zero and a maximum. This simulates the output of a telephotograph sender scanning copy of various densities and may be desirable when the linearity of a long circuit is to be tested in order to determine whether it faithfully transmits various shades of gray.

What is claimed is:

In a test signal generator for scanned picture signal transmission circuits, a source of carrier waves of frequency $F_2$, a chain circuit, an oscillator of frequency $F_1$ arranged to drive said chain circuit for the production of serial pulses on individual output leads, switching means for connecting preselected ones of said output leads to control the application of waves from said carrier oscillator to said transmission circuits and shaping means comprising an equalizer having a shunt impedance and a shunt resonant circuit acting upon the output of said oscillator to multiply the frequency spectrum of the signals therefrom by the amplitude factor proportional to $$\frac{F_1}{(F_2-f)\pi} \sin \frac{(F_2-f)\pi}{F_1}$$

where $f$ is the particular frequency within the pass band of the transmission circuits.

References Cited in the file of this patent

UNITED STATES PATENTS

| | | |
|---|---|---|
| 2,050,505 | Siskind | Aug. 11, 1936 |
| 2,409,229 | Smith et al. | Oct. 15, 1946 |
| 2,538,017 | Krause et al. | Jan. 16, 1951 |
| 2,559,644 | Landon | July 10, 1951 |
| 2,621,251 | Aigrain | Dec. 9, 1952 |
| 2,631,275 | Finlay | Mar. 10, 1953 |